United States Patent [19]
Davis, Jr.

[11] 3,766,941
[45] Oct. 23, 1973

[54] PRESSURE AND VACUUM RELIEF VALVE

[76] Inventor: Roy Forrest Davis, Jr., 405 Loma Linda Dr., Apt. D, Fort Collins, Colo. 80521

[22] Filed: Apr. 24, 1972

[21] Appl. No.: 247,152

[52] U.S. Cl. ............................................ 137/493.4
[51] Int. Cl. ............................................ F16k 17/196
[58] Field of Search .............. 137/493.4, 493, 493.3, 137/493.6, 493.9

[56] References Cited
UNITED STATES PATENTS

| | | | |
|---|---|---|---|
| 737,809 | 9/1903 | Whitaker | 137/493.4 |
| 2,000,431 | 5/1935 | Aumack | 137/493.4 X |
| 2,162,743 | 6/1939 | Norbom | 137/493.4 |

Primary Examiner—Henry T. Klinksiek
Assistant Examiner—Robert J. Miller
Attorney—Morton S. Adler

[57] ABSTRACT

A combination high pressure and vacuum relief valve to relieve excess pressure buildups and overload surges in fluid flow lines, to release and break up any vacuum conditions which might develop in the opening and closing of the fluid flow, and to serve as an air bleeder device to exhaust trapped air when the flow system is started up. The pressure relief function is provided by a spring loaded valve cap for which a precisely calculated pressure scale and indicator is provided and the vacuum breaker valve is also spring loaded in cooperative association with the pressure relief valve assembly.

5 Claims, 5 Drawing Figures

PATENTED OCT 23 1973 3,766,941
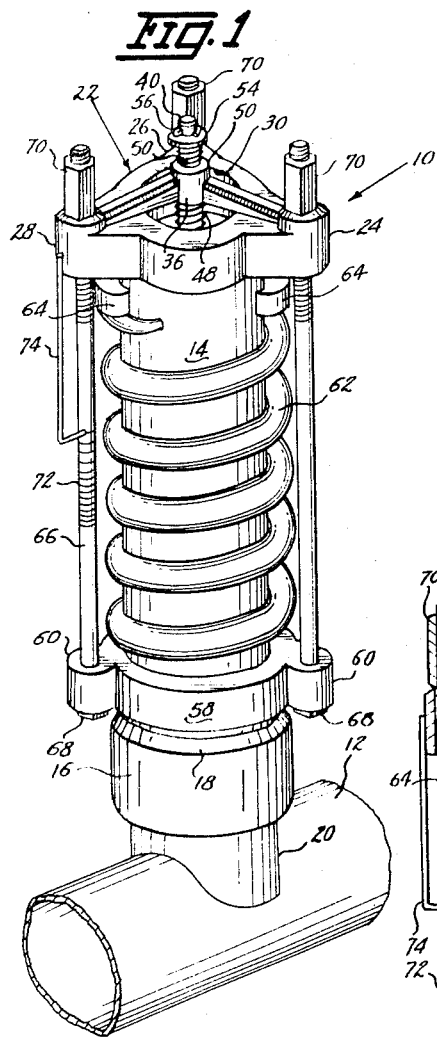
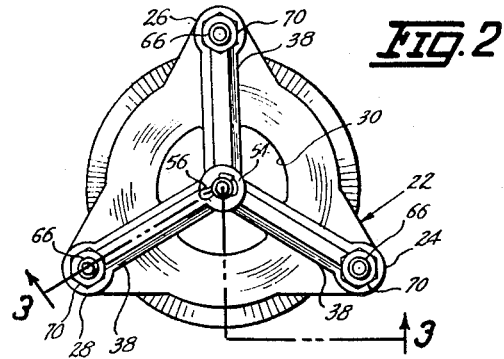
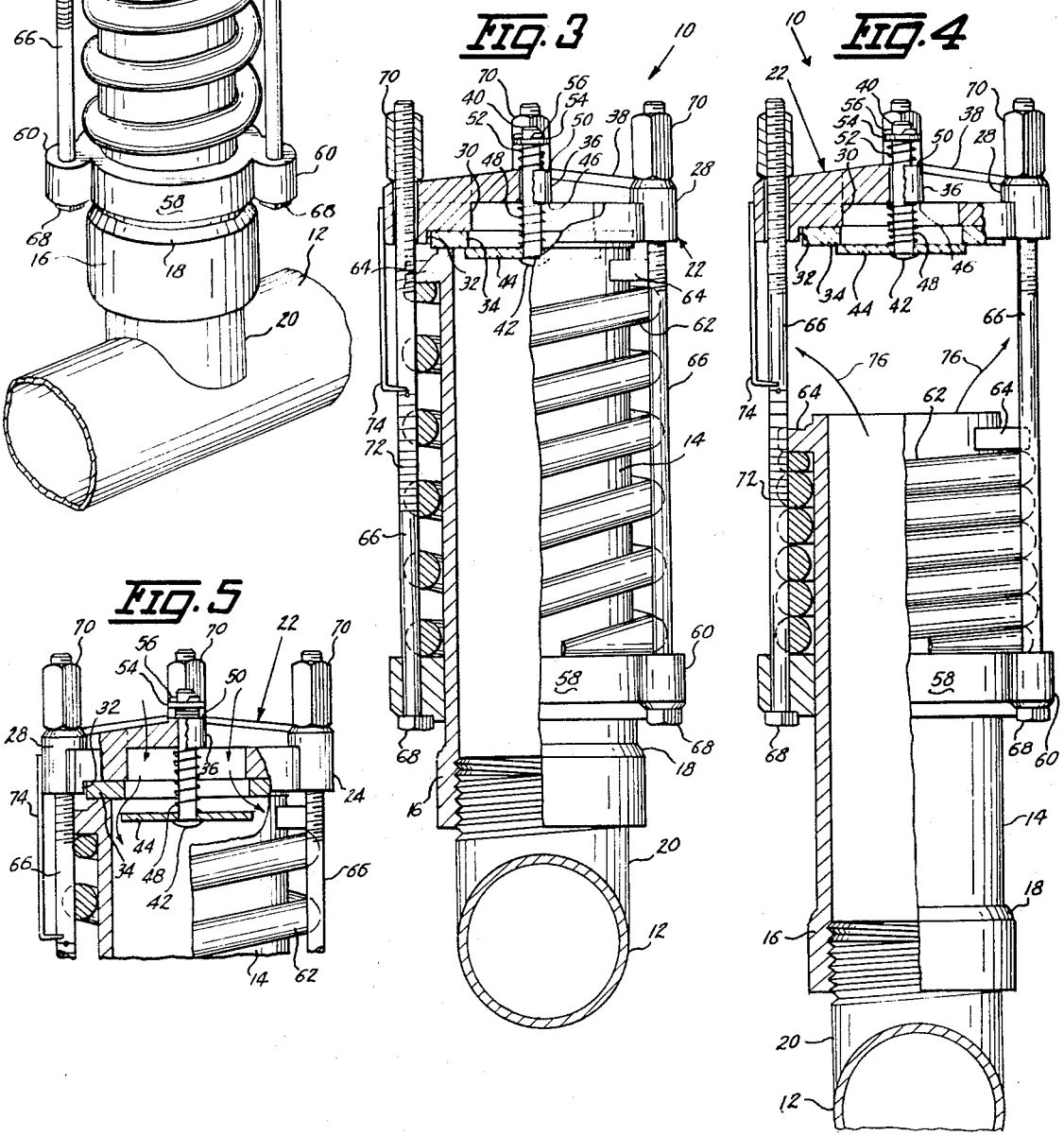
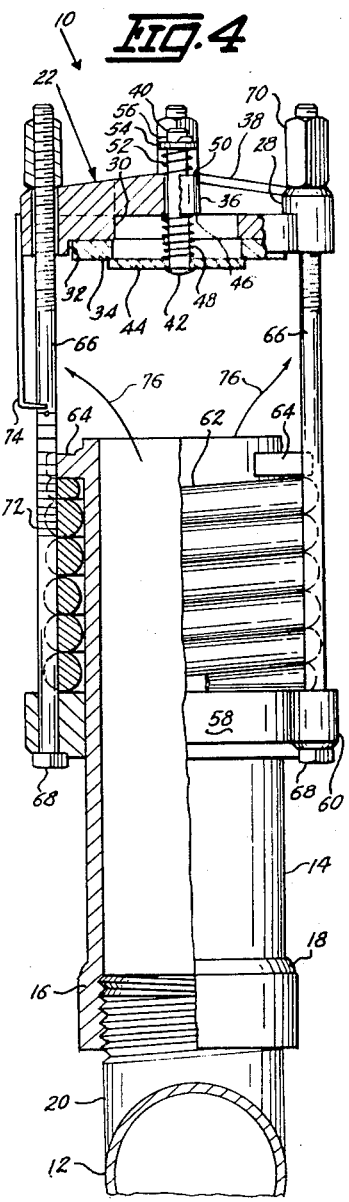
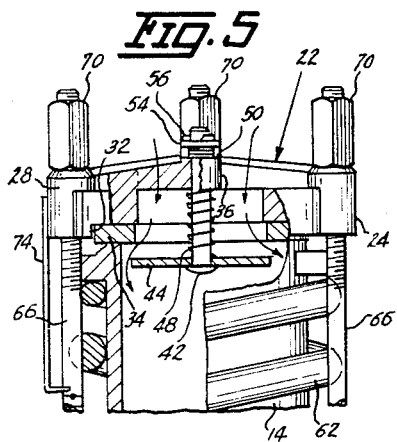

PRESSURE AND VACUUM RELIEF VALVE

BACKGROUND OF THE INVENTION

This invention relates to a combination high pressure and vacuum relief valve designed more particularly for use in large irrigation systems.

In fluid flow lines such as found in irrigation systems, there are at times unexpected buildups of excess pressure and overload surges which can result in considerable damage including rupture of the line unless such pressure is relieved and also, during the operation of such irrigation lines when the flow is periodically shut down and restarted, certain vacuum conditions frequently arise which adversely effect the efficient operation of the entire system and the present invention is concerned with a new and improved combination pressure and vacuum relief valve to effectively accommodate the situations where such excess pressure and vacuum conditions arise.

The use of pressure relief valves is not new as exemplified in U.S. Pat. No. 2,973,908 and in my own U.S. Pat. No. 3,447,565 but the present invention combines both the features of pressure and vacuum release which function automatically to provide considerably improved efficiency in valves of this type.

SUMMARY

This new valve includes a vertically disposed pipe body adapted to be secured to a suitable riser pipe which is attached to a horizontal underground flow line. A spring loaded valve cap assembly mounted to the pipe body maintains an appropriate seal at the outlet end of the pipe body for which precisely calibrated PSI designations are provided so that the tension on the cap may be easily set for unseating at accurately predetermined pressures.

Associated with the valve cap assembly and outlet end of the pipe body is a spring loaded vacuum relief valve which is maintained in a closed position during the operation of the flow system by pressure therein but which is designed to open when the system is shut down and to remain open after the system is started up until all accumulated air has been exhausted.

BRIEF DESCRIPTION OF THE DRAWINGS

FIG. 1 is a perspective view of this new combination pressure and vacuum relief valve shown in relationship to a fragmentary portion of an irrigation pipe, FIG. 2 is a top view of this valve, FIG. 3 is a longitudinal section view taken on the line 3—3 of FIG. 2 showing both the pressure valve and the vacuum relief valve in closed position, FIG. 4 is a view similar to FIG. 3 but showing the pressure relief valve in open position and the vacuum breaker valve in closed position, and FIG. 5 is a fragmentary upper portion of the valve seen in FIG. 3 showing the pressure relief valve closed and the vacuum breaker valve in open position.

DESCRIPTION OF THE PREFERRED EMBODIMENTS

Referring to the drawings, this pressure and vacuum relief valve is designated generally by the numeral 10 and is illustrated in its preferred environmental use in FIG. 1 where it is shown mounted to a water supply line 12 that is part of an irrigation system. It will be understood that line 12 is associated with suitable pumping mechanism (not shown) and the purpose and function of valve 10 is to provide an efficient, dependable and automatically operable pressure and vacuum relief for overload surges and pressure and any vacuum condition that may develop in line 12.

An elongated cylindrical valve body 14, adapted to be vertically disposed, includes at its lower end an internally threaded fitting or coupling 16 which is secured to body 14 in any suitable manner such as by the weld 18 and such coupling is adapted for threadable engagement with an upstanding riser pipe 20 secured to line 12 as shown and in communication with the interior thereof.

A valve cap assembly designated generally by the numeral 22 includes both the pressure relief cap and vacuum breaker cap as will appear and assembly 22 is generally triangular in its peripheral outline, having the respective spaced vertically bored hanger rod supports 24, 26 and 28. The central or body portion of the valve cap assembly 22 is provided with a vacuum breaker opening 30 smaller than but concentric with pipe 14, and on the lower or under side of assembly 22, opening 30 is concentrically enlarged to provide the recess or well 32 which has a diameter slightly in excess of that of valve body 14. A suitable gasket ring member 34 is mounted in recess 32 so as to be capable of sealing engagement with the top of valve body 14 as will be described.

Disposed axially over opening 30, a vertically bored valve stem housing 36 is secured by a spider arrangement 38 to each of the respective supports 14, 26 and 28. Housing 36 is designed for the vacuum relief valve assembly which cooperates with opening 30 in valve cap assembly 22 as will appear and for which purpose valve stem 40 is vertically journalled for reciprocal movement. The bottom of stem 40 is provided with a head 42 to retain the vacuum valve cap 44 mounted on rod 40 and intermediate cap 44 and the lower surface 46 of housing 36 there is mounted the vacuum valve operating compression spring 48. The diameter of vacuum cap 44 is somewhat larger than the diameter of opening 30 but less than the inside diameter of valve body 14 and cap 44 is designed to provide a fluid seal closure between valve body 14 and opening 30. On the upper side 50 of housing 36, I have placed a vacuum valve balancing spring 52 on valve stem 40 and such spring extends to the upper portion of rod 40 where it abuts the retaining washer 54 held in place by the vacuum valve stem cotter pin 56.

For mounting the valve cap assembly 22 to the valve body 14, I provide the collar-type hanger 58 which is adapted to encircle the lower end of valve body 14 and on the perimeter of which is provided three like bored support members 60 suitably spaced so that the respective bores in members 60 can be placed in registry with the bores in the rspective supports 24, 26 and 28 of the cap assembly 22. A heavy pressure valve compression spring 62 is disposed on valve body 14 as best seen in FIG. 1 so as to bear against support 58 at its lower end and at its upper end to engage the under side of spaced retaining lugs 64 secured to the upper end portion of the valve body 14. Valve cap assembly 22 is secured to the support 58 by connecting each of the support points 60 on member 58 with one of the corresponding supports 24, 26 and 28 on the cap assembly 22 and for this purpose, I utilize three like hanger rods 66 with each rod journalled through one of the respective supports 60 and a corresponding support 24, 26 or 28 on the cap assembly 22. The ends of rods 66 are threaded and a suitable retaining nut 68 is on each rod 66 below support 60 with a respective pressure adjustment nut 70 at the upper end of each rod above the respective supports 24, 26 and 28.

OPERATION

With this pressure and vacuum relief valve constructed as described, it will operate in the following manner. As seen in FIG. 1, the respective pressure adjustment nuts 70 can be tightened so as to compress the heavy spring 62 to withstand any desired limits of PSI. To aid in making this adjustment, one of the rods 66 is provided with precisely scaled calibrations 72 which for purposes of convenience have been determined by an appropriate test to represent pressure limits in the amount of ten PSI per calibration. In addition, on the cap assembly frame 22 corresponding to location of the rod 66 having the claibration 72, I have secured an indicator pointer 74 which registers with the calibration 72 as the adjustment nuts are tightened or loosened. Thus, in an original setting, the pressure valve sealing gasket 34 will be in sealing engagement with the top of the valve body 14 as seen in FIGS. 3 and 5 and it will maintain such sealing contact up to the pressure for which it has been set and which is visibly ascertainable because of indicator 74. When the flow system through pipe 20 is in operation, the vacuum valve cap 44 will be in closed position as seen in FIG. 3 due to pressure within the valve body 14 but when the flow through pipe 12 is shut down and such pressure from the pumps ceases, the vacuum valve operating spring 48 will urge the vacuum cap 44 to open position as seen in FIG. 5. This will vent the riser pipe 20 to the atmosphere through the vacuum breaker opening 30 in the valve cap assembly 22 to permit the intake of air as the flow through line 12 is reversed and thus prevent the establishing of any vacuum condition.

Should the pressure for which valve cap assembly 22 is set be exceeded by high pressure through line 12, this will cause the valve cap assembly 22 and the support 58 to rise, compress the spring 62 and elevate both the pressure gasket 34 and the vacuum valve cap 44 from the top of valve body 14 so as to permit the escape of pressure as seen in FIG. 4 and indicated by arrows 76. It will be appreciated that the unseating of the pressure valve gasket 34 may be only momentarily but during such time the vacuum valve cap 44 will remain closed as shown. The vacuum valve cap 44 remains open when the system is shut off due to spring 48, and upon the starting up of the system as the flow under pressure pushes air into the riser pipe 20, the vacuum valve cap 44 will remain open to permit such air to escape or bleed out through opening 30 and as the air is exhausted, the pressure from fluid rising in pipe 20 will act to close cap 44 and maintain it in that position.

It is recommended that for full and complete protection of an irrigation system against high pressure buildup and vacuum conditions, a combination pressure and vacuum relief valve of the above type be installed both at the head and tail of the system. Accordingly, from all of the foregoing, it is thought that a full and complete understanding of the construction and operation of this valve will be had and its advantages appreciated.

I claim:

1. A high pressure and vacuum relief valve, comprising:
    an elongated valve body having a top and bottom end with the bottom end adapted for attachment to a fluid flow line so as to communicate with the interior thereof,
    a valve cap assembly,
    means mounting said valve cap assembly to the top of said valve body, comprising:
        a plurality of concentrically spaced stop members secured to said valve body near the top thereof,
        a compression spring disposed on said valve body so that one end abuts said stop members,
        adustable fastening means operably connecting said valve cap assembly with the other end of said spring whereby said valve cap assembly can be secured in pressure sealing engagement with said valve body under predetermined compression settings of said spring and be capable of movement out of such sealing engagement when pressure within said valve body exceeds that for which the spring has been set,
    said valve cap assembly being provided with a pressure related openable and closable vent to the atmosphere, and
    means on said valve cap assembly operatively associated with said vent so as to permit of its opening and closing independently of the pressure seal engage-ment with said valve body.

2. A valve as defined in claim 1 including:
    precisely calibrated visual indicia designating PSI pressure setting positions for said spring carried by said fastening means, and
    indicator means secured to said valve cap assembly for cooperative association with said indicia.

3. A high pressure and vacuum relief valve, comprising:
    an elongated valve body provided with a through bore and having a top and bottom end with the bottom end adapted for attachment to a fluid flow line so as to communicate with the interior thereof,
    a valve cap assembly having a through opening of lesser diameter than but in registry with the bore in said valve body,
    means mounting said valve cap assembly to the top edge of said valve body, comprising:
        a collar slidably disposed around the bottom portion of said valve body,
        spaced lugs secured to said valve body near the top thereof,
        a compression spring on said valve body so that one end of said spring abuts said collar and the other end abuts said lugs,
        adjustable fastening means connecting said valve cap assembly to said collar whereby said valve cap assembly can be secured in sealing engagement with said valve body under predetermined compression settings of said spring and be capable of movement out of such sealing engagement when pressure within said valve body exceeds that for which the spring has been set, and
    means carried said valve cap assembly for a yielding vacuum seal engagement with the through opening therein.

4. A valve as defined in claim 3 wherein the means carried by said cap assembly for a yielding vacuum sael engagement with said through opening, includes:

a spring loaded valve stem having a valve cap on one end, and means axially disposed on said valve cap assembly for housing said valve stem so that said valve cap is disposed at the bottom side of said valve cap assembly within the confines of the bore of the valve body and adapted for yieldable sealing engagement with said through opening.

5. A valve as defined in claim 4 including said valve cap being normally urged to open position relative to said through opening but maintained in sealing engagement therewith when pressure is present in said valve body and in the absence of pressure in said valve body, said valve cap moving out of sealing engagement with said through opening to vent said valve body to the atmosphere.

* * * * *